United States Patent [19]
Becker

[11] 3,955,367
[45] May 11, 1976

[54] FLUID CLUTCHES
[75] Inventor: John Edward Becker, Bowmanville, Canada
[73] Assignee: Cluaran Associates Ltd., Oshawa, Canada
[22] Filed: Dec. 18, 1974
[21] Appl. No.: 534,035

[30] Foreign Application Priority Data
Dec. 28, 1973 United Kingdom............... 59995/73

[52] U.S. Cl................................... 60/347; 60/353; 60/364; 60/365
[51] Int. Cl.² ......................................... F16D 33/06
[58] Field of Search ............. 60/330, 347, 350, 353, 60/361, 362, 364, 365, 341, 342

[56] References Cited
UNITED STATES PATENTS

| | | | |
|---|---|---|---|
| 2,267,476 | 12/1941 | Patterson............................... | 60/356 |
| 2,270,545 | 1/1942 | Neracher et al...................... | 60/350 |
| 2,354,596 | 7/1944 | Jandasek............................ | 60/365 X |
| 2,391,413 | 12/1945 | Gregg ..................................... | 60/353 |
| 3,357,180 | 12/1967 | Sanders.................................. | 60/350 |
| 3,572,480 | 3/1971 | Nagel................................ | 60/353 X |

Primary Examiner—Edgar W. Geoghegan
Attorney, Agent, or Firm—Hirons & Rogers

[57] ABSTRACT

In a fluid clutch of the type comprising cooperating pump and turbine elements between which toroidal power-transmitting liquid vortices can be established, control of the clutch by an operator is effected by moving a baffle within the working chamber between a clutched position in which the vortices can be established and maintained, and a declutched position in which it is interposed in the path taken by such vortices and prevents their establishment and maintainence. The baffle is operative to produce the required de-clutching and clutching action by changing the operative volume of the clutch element in which it is mounted. In a preferred structure a radially-slotted annular baffle is mounted on a cylindrical sleeve slidable on the output shaft and moves within the turbine chamber toward and away from the pump element, the turbine vanes entering the slots in the baffle; a spring urges the sleeve and the baffle toward the clutch engaged position further from the pump element.

6 Claims, 2 Drawing Figures

FLUID CLUTCHES

FIELD OF THE INVENTION

The present invention is concerned with improvements in or relating to fluid clutches of the type comprising cooperating pump and turbine elements between which toroidal power-transmitting liquid vortices can be established under control of an operator.

REVIEW OF THE PRIOR ART

A fluid clutch is proposed in U.S. Pat. Ser. No. 2,270,545 wherein the said pump and turbine elements are provided with respective radially-extending sets of vanes, and one of the sets is movable axially through the wall of its element between a fully-inserted clutched position in which they are fully operative inside the element, and a fully-withdrawn de-clutched position in which power is not transmitted since essentially no vortices can be maintained.

DEFINITION OF THE INVENTION

It is an object of the invention to provide a new fluid clutch.

It is a more specific object to provide a new fluid clutch including a new means for clutching and de-clutching thereof by control of the establishment of the power-transmitting vortices.

In accordance with the present invention there is provided a fluid clutch comprising power input and power output means, a pump element and a turbine element connected respectively to the power input and output means for rotation thereby and providing respectively co-operating pump and turbine chambers rotatable about the same axis and constituting a working chamber, a set of vortex-producing vanes in each of the pump and turbine chambers respectively, a quantity of liquid in the working chamber, baffle means mounted by one of the said elements within the working chamber for movement relative to the said vanes between a de-clutched position in which the baffle means prevents the maintenance of such vortices and a clutched position in which establishment and maintenance of such vortices is permitted the said baffle means in their movement between the said de-clutched and clutched positions changing the operative volume of the element chamber in which they are mounted to effect the respective de-clutching and clutching action.

Preferably the vortex-producing vanes extend radially relative to the said axis and the baffle is of annular form movable axially in the working chamber. The baffle means may be operative in either the pump or the turbine element and preferably is operative in the turbine element.

DESCRIPTION OF THE DRAWINGS

A fluid clutch which is a particular preferred embodiment of the invention will now be described, by way of example, with reference to the accompanying diagrammatic drawing, wherein.

DESCRIPTION OF THE PREFERRED EMBODIMENTS

Figure 1:
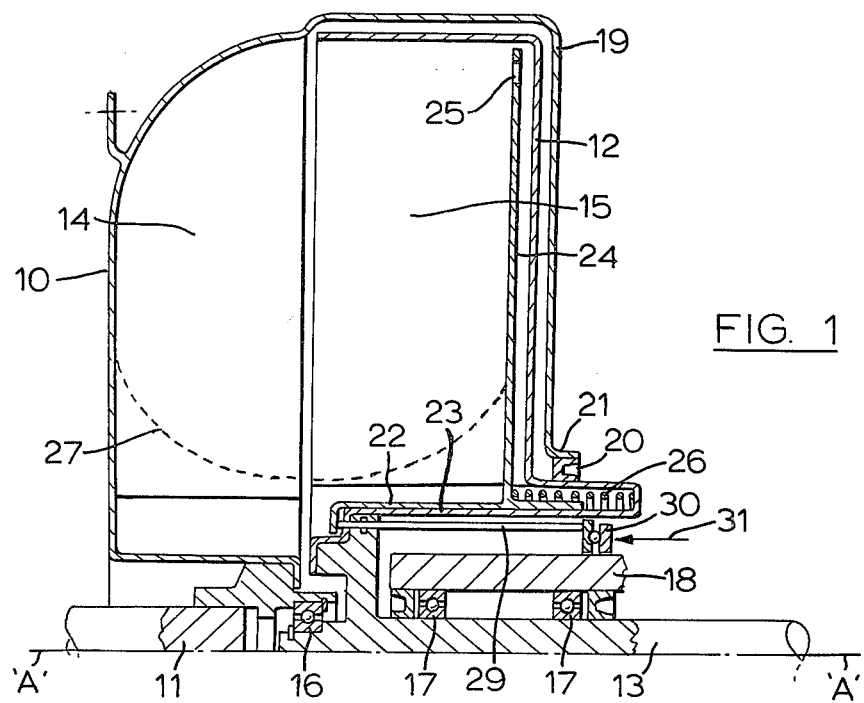
FIG. 1 is a longitudinal cross section in a plane containing the common rotational axis of the two coupling elements and showing a vortex-controlling baffle in its fully clutched position.

The clutch particularly illustrated herein comprises a pump element 10 connected to a power input shaft 11 that is in turn adapted to be connected to a prime mover, and a turbine element 12 connected to a power output shaft 13 that is in turn adapted to be connected to apparatus to be driven via the clutch. The pump and turbine interiors together form the usual working chamber. The pump interior is provided with fixed radially-extending vanes 14 while the turbine interior is provided with radially-extending vanes 15. In this embodiment the immediately adjacent inner ends of the two shafts 11 and 13 are mutually supported by a ball bearing 16, while the shaft 13 is mounted by bearings 17 in a fixed part 18 of the clutch casing. An extension 19 of the pump element surrounds the turbine element in known manner to retain the working liquid in the coupling, a rotatable, fluid-tight joint 20 being provided between the radially-inner end 21 of the said extension 19 and an adjacent axially-extending part of the turbine element.

The vanes 14 and 15 terminate short of the axially inner ends of their respective elements to leave an annular space in which a cylindrical sleeve member 22 can move, this element being mounted on and rotatable with a corresponding cylindrical part 23 of the turbine element, its cylindrical axis being coaxial with the axis of rotation A—A of the clutch. Baffle means for the clutch are constituted by this member 22 and by a radially-slotted, radially-extending annular baffle 24 whhich is fixed to the member 22 and is movable therewith axially inside the turbine interior. Each of the turbine vanes 15 is a close sliding fit in a corresponding radial slot in the baffle, and the baffle is provided around its periphery with a number of holes 25 to facilitate its movement through the working liquid.

Figure 2:
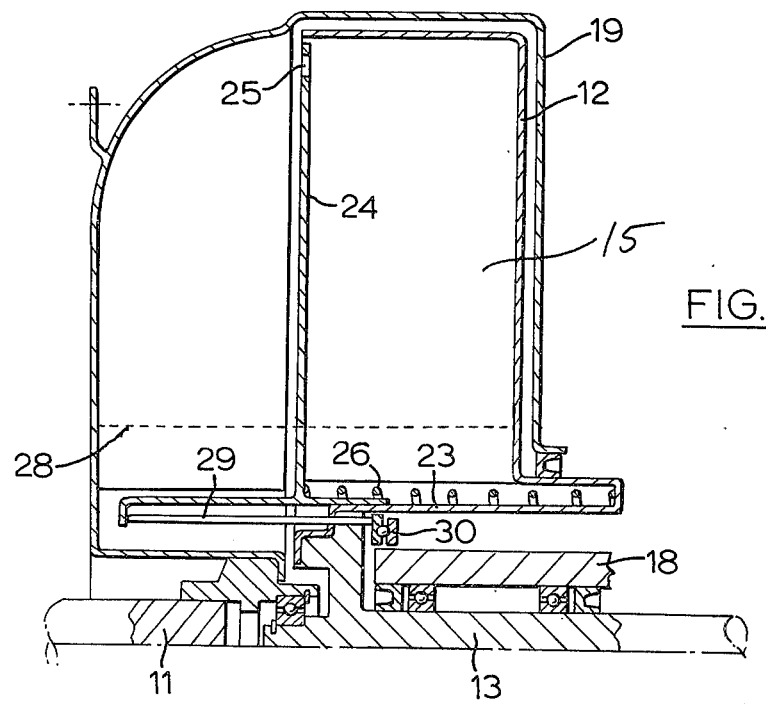
FIG. 2 is a similar view showing the baffle in its fully de-clutched position.

The cylindrical sleeve member 22 and the baffle are urged to a fully clutched position shown in FIG. 1 of the drawing by a tension spring 26 connected between the member and the casing 12. With the baffle in this position the usual toroidal power-transmitting vortices are formed, the position of their radially-inner boundary being indicated by the line 27. The clutch is de-clutched at any time under the control of the operator by moving the baffle axially to the extreme de-clutched position shown in FIG. 2, whereby the working liquid is unable to form vortices and there is virtually no transmission of power through the device. Liquid will be present in the turbine element and its radially-inner boundary is indicated by the broken line 28. Such axial movement of the baffle means is in this embodiment produced by a push rod 29 which is engaged by any suitable push mechanism (not shown) via a thrust bearing 30, the push mechanism being operative in the direction of the arrow 31 in FIG. 1 against the action of the spring 26.

As the baffle moves progressively axially from the clutched position toward the de-clutched position there is a corresponding progressive decrease of the operative volume of the turbine element chamber. There will be an initial gradual reduction of power transmission as the vortices are "squeezed" axially, the excess liquid escaping through the apertures 25 to the other side of the baffle where it is no longer effective. At some point in the travel of the baffle the operative volume is so small that the vortices can no longer be maintained and there will be a corresponding sharp decrease in power transmission capacity. Some transmission capacity will remain caused by friction of liquid between the pump vanes and the exposed portion of the turbine vanes, but this also will disappear when the baffle moves to the extreme de-clutched position illustrated in which the turbine vanes are completely shielded. Upon return of movement of the baffle toward the clutch position the vortices will become re-established when the operative volume of the turbine element chamber is sufficiently large.

Although the invention is specifically illustrated with the baffle disposed in the turbine element it can instead be located in the pump element. If a brake is required to hold the turbine element against rotation by the effect of any residual power transmission such brake can take the form disclosed in my U.S. application Ser. No. 471,519.

I claim:

1. A fluid clutch comprising power input and power output means, a pump element and a turbine element connected respectively to the power input and output means for rotation thereby and providing respectively co-operating pump and turbine chambers rotatable about the same axis and constituting a working chamber, a set of vortex-producing vanes in each of the pump and turbine chambers respectively, a quantity of liquid in the working chamber, baffle means mounted by one of the said elements within the working chamber for movement relative to the said vanes between a de-clutched position in which the baffle means prevents the maintenance of such vortices and a clutched position in which establishment and maintenance of such vortices is permitted, the said baffle means in their movement between the said de-clutched and clutched positions changing the operative volume of the element chamber in which they are mounted to effect the respective de-clutching and clutching action.

2. A fluid clutch as claimed in claim 1, wherein the vortex-producing vanes extend radially relative to the said axis and the baffle is of annular form movable axially in the working chamber.

3. A fluid clutch as claimed in claim 2, wherein the said baffle means is mounted for movement within the turbine element.

4. A fluid clutch as claimed in claim 1, wherein the power input and output means comprise respective coaxial shafts and the said baffle means comprise a cylindrical sleeve mounted around one shaft coaxial therewith and movable axially thereon, an annular slotted baffle plate fixed to the sleeve for axial movement therewith in the respective member toward and away from the other member with the vanes of the said respective member extending through the slots in the baffle plate.

5. A fluid clutch as claimed in claim 4, wherein the said one shaft is the output shaft and the said respective member is the turbine member.

6. A fluid clutch as claimed in claim 4, and including spring means interposed between the said sleeve and one of the clutch elements and urging the baffle means to the clutched position.

* * * * *